US011783461B2

(12) United States Patent
Lu et al.

(10) Patent No.: US 11,783,461 B2
(45) Date of Patent: Oct. 10, 2023

(54) FACILITATING SKETCH TO PAINTING TRANSFORMATIONS

(71) Applicant: Adobe Inc., San Jose, CA (US)

(72) Inventors: Jingwan Lu, Sunnyvale, CA (US); Patsorn Sangkloy, Atlanta, GA (US); Chen Fang, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/170,209

(22) Filed: Feb. 8, 2021

(65) Prior Publication Data

US 2021/0158494 A1 May 27, 2021

Related U.S. Application Data

(62) Division of application No. 15/457,830, filed on Mar. 13, 2017, now Pat. No. 10,916,001.

(Continued)

(51) Int. Cl.
*G06T 5/20* (2006.01)
*G06N 3/04* (2023.01)
(Continued)

(52) U.S. Cl.
CPC .............. *G06T 5/20* (2013.01); *G06N 3/045* (2023.01); *G06N 3/08* (2013.01); *G06T 11/00* (2013.01);
(Continued)

(58) Field of Classification Search
None
See application file for complete search history.

(56) References Cited

U.S. PATENT DOCUMENTS 6,219,459 B1 * 4/2001 Kurashige ................. G06T 7/12
382/199
2003/0095701 A1   5/2003 Shum et al.
(Continued)

FOREIGN PATENT DOCUMENTS

CN       105719327 A    6/2016
EP          1301894 B1  11/2001
WO      2016037300 A1   3/2016

OTHER PUBLICATIONS

Iizuka, Satoshi, Edgar Simo-Serra, and Hiroshi Ishikawa. "Let there be color! Joint end-to-end learning of global and local image priors for automatic image colorization with simultaneous classification." ACM Transactions on Graphics (ToG) 35.4 (2016): 1-11. (Year: 2016).*

(Continued)

*Primary Examiner* — Sean M Conner
(74) *Attorney, Agent, or Firm* — Shook, Hardy & Bacon L.L.P.

(57) ABSTRACT

Methods and systems are provided for transforming sketches into stylized electronic paintings. A neural network system is trained where the training includes training a first neural network that converts input sketches into output images and training a second neural network that converts images into output paintings. Similarity for the first neural network is evaluated between the output image and a reference image and similarity for the second neural network is evaluated between the output painting, the output image, and a reference painting. The neural network system is modified based on the evaluated similarity. The trained neural network is used to generate an output painting from an input sketch where the output painting maintains features from the input sketch utilizing an extrapolated intermediate image and reflects a designated style from the reference painting.

20 Claims, 7 Drawing Sheets

Related U.S. Application Data

(60) Provisional application No. 62/426,959, filed on Nov. 28, 2016.

(51) Int. Cl.
  *G06N 3/08* (2023.01)
  *G06T 11/00* (2006.01)
  *G06N 3/045* (2023.01)

(52) U.S. Cl.
  CPC .. *G06T 11/001* (2013.01); *G06T 2207/20081* (2013.01); *G06T 2207/20084* (2013.01)

(56) References Cited

U.S. PATENT DOCUMENTS

| | | | |
|---|---|---|---|
| 2010/0254594 A1* | 10/2010 | Wang | G06T 11/00 382/203 |
| 2012/0243032 A1 | 9/2012 | Hayakawa | |
| 2014/0270489 A1 | 9/2014 | Lim et al. | |
| 2015/0310305 A1 | 10/2015 | Fang et al. | |
| 2016/0050169 A1* | 2/2016 | Ben Atar | H04M 1/72427 709/206 |
| 2018/0068463 A1 | 3/2018 | Risser | |

OTHER PUBLICATIONS

Liu, Xiaoming, Jun Liu, and Zhilin Feng. "Colorization using segmentation with random walk." International Conference on Computer Analysis of Images and Patterns. Springer, Berlin, Heidelberg, 2009. (Year: 2009).*

Li, Mu, Wangmeng Zuo, and David Zhang. "Convolutional network for attribute-driven and identity-preserving human face generation." arXiv preprint arXiv:1608.06434 (2016). (Year: 2016).*

Wang, Xiaohui, et al. "Image colorization with an affective word." Computational Visual Media: First International Conference, CVM 2012, Beijing, China, Nov. 8-10, 2012. Proceedings. Springer Berlin Heidelberg, 2012. (Year: 2012).*

Chia, Alex Yong-Sang, et al. "Semantic colorization with internet images." ACM Transactions on Graphics (ToG) 30.6 (2011): 1-8. (Year: 2011).*

Güçlütürk, Y., Güçlü, U., van Lier, R., & van Gerven, M. A. (Oct. 2016). Convolutional sketch inversion. In European conference on computer vision (pp. 810-824). Springer, Cham.

Gatys, L. A., Ecker, A. S., & Bethge, M. (2016). Image style transfer using convolutional neural networks. In Proceedings of the IEEE conference on computer vision and pattern recognition (pp. 2414-2423).

Zhu, J. Y., Krähenbühl, P., Shechtman, E., & Efros, A. A. (Oct. 2016). Generative visual manipulation on the natural image manifold. In European conference on computer vision (pp. 597-613). Springer, Cham.

Yu, F., Seff, A., Zhang, Y., Song, S., Funkhouser, T., & Xiao, J. (2015). Lsun: Construction of a large-scale image dataset using deep learning with humans in the loop. arXiv preprint arXiv:1506.03365.

Taigman, Y., Polyak, A., & Wolf, L. (2016). Unsupervised cross-domain image generation. arXiv preprint arXiv:1611.02200.

Isola, P., Zhu, J. Y., Zhou, T., & Efros, A. A. (2017). Image-to-image translation with conditional adversarial networks. In Proceedings of the IEEE conference on computer vision and pattern recognition (pp. 1125-1134).

Wang, X., & Gupta, A. (Oct. 2016). Generative image modeling using style and structure adversarial networks. In European conference on computer vision (pp. 318-335). Springer, Cham.

Johnson, J., Alahi, A., & Fei-Fei, L. (Oct. 2016). Perceptual losses for real-time style transfer and super-resolution. In European conference on computer vision (pp. 694-711). Springer, Cham.

* cited by examiner

FACILITATING SKETCH TO PAINTING TRANSFORMATIONS

CROSS REFERENCE TO RELATED APPLICATIONS

This application is a Division of U.S. patent application Ser. No. 15/457,830 filed Mar. 13, 2017 and titled "Facilitating Sketch to Painting Transformations," which itself claims the benefit of U.S. Provisional Application No. 62/426,959, filed Nov. 28, 2016, the entire contents of each of the foregoing applications being incorporated by reference herein in their entirety.

BACKGROUND

Oftentimes, to create an electronic painting, users begin with providing a sketch on a canvas and add details thereafter. Creating a detailed hand-drawn electronic painting is a difficult and tedious task, even for professional artists. Currently, a user can use existing systems to input a completed sketch to attempt to generate a painting. However, because these systems have not been created for the purpose of generating a painting from a sketch, the resulting electronic painting does not accurately reflect the given sketch.

SUMMARY

Embodiments of the present invention are directed towards a system trained to generate an electronic painting from a sketch, where the painting accurately reflects features of the sketch in a designated painting style. One method available for creating such a system is using a neural network. Neural networks can be trained to assist in converting a sketch into a detailed electronic painting. The quality of a painting generated by a neural network system depends upon how the system is trained and what data it receives during training. To create a neural network system that is trained to generate stylistically accurate paintings from input sketches, the system must be trained to extrapolate, anticipate, deduce, or project, additional detail from the minimal features of a sketch. Such a system can be comprised of multiple neural networks.

Training of such a neural network system can be accomplished using an image neural network and a painting neural network. First, the image neural network is trained by inputting a training sketch into the image neural network to generate a training intermediate image. A neural network system including such an intermediate image ensures that the system learns to extrapolate details from a minimal sketch to the degree necessary to generate an adequately detailed painting. Differences between the training intermediate image and a reference image are used to determined errors in the image neural network. The reference image is what the intermediate image should look like if the neural network was functioning perfectly. In other words, the reference image is a ground-truth image that the network compares itself to in order to determine errors. Such errors can be used to improve the image neural network by backwards propagation of the errors through the network.

Training intermediate images generated by the image neural network can then be used to train a painting neural network to generate stylized paintings. In embodiments, this training is accomplished by imputing a training intermediate image into the painting neural network to produce a corresponding stylized training output painting. The training output painting is then compared to a reference painting and the training intermediate image. This comparison can determine various differences between the training output painting, the training intermediate image, and/or the reference painting. These differences can indicate errors in the painting neural network. Such errors are used to improve the painting neural network by backwards propagation of the errors through the network. The neural network system can be trained for various painting styles to allow the system to be used to generate paintings of a variety of styles.

DETAILED DESCRIPTION

Figure 1:
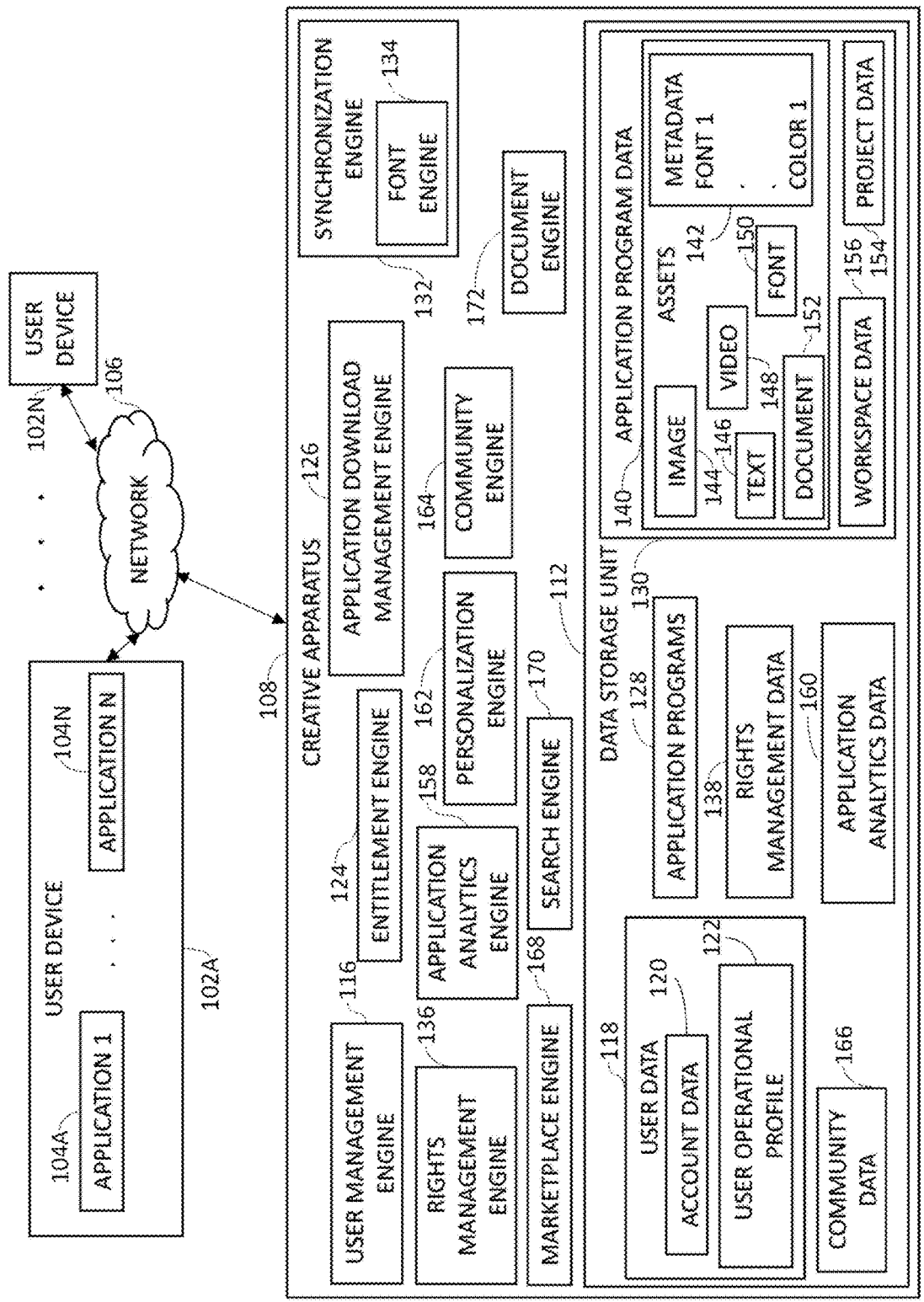
FIG. 1 depicts a diagram of an environment in which one or more embodiments of the present disclosure can be practiced, in accordance with various embodiments of the present disclosure.

Oftentimes, users desire to create paintings that reflect particular painting styles, such as, for example, styles resembling the artistic work of Van Gogh, Monet, or Rembrandt. To produce such an electronic painting, a user generally creates a basic sketch, often in grayscale, and, thereafter, applies details and colors to the sketch in accordance with the user's stylistic preferences. Creating such a detailed electronic painting, especially reflecting a particular painting style, however, is a difficult and tedious task, even for professional artists.

To reduce the amount of manual time and effort used to generate an electronic painting, a user may attempt to utilize an existing approach generally used to convert photographs into electronic paintings. In particular, rather than providing a photograph as input, a user may provide a grayscale sketch as input in an effort to produce an electronic painting. The produced electronic painting, however, is oftentimes unsatisfactory to the user, as the resulting painting does not maintain features of the grayscale sketch (e.g., when the image is a portrait of a person, one or both eyes, the mouth, and/or the nose of the person can be distorted, obscured, and/or inaccurate; when the image is a landscape, one or more trees and/or a horizon line from the landscape can be distorted, obscured, and/or inaccurate; when the image is a bedroom scene, a bed, a lamp, and/or a corner of a room can be distorted, obscured, and/or inaccurate) and/or does not reflect a desired painting style. This result occurs because such an existing approach is optimized for converting photographs into paintings. In this regard, such an approach inadequately maintains and/or anticipates features from a sketch during conversion into an electronic painting and/or insufficiently applies a painting style to the minimal content of a sketch. Further, because such an existing approach can only generate a painting from a completed sketch, a user is unable to modify a sketch and preview in real-time how such modifications affect the generated painting.

Accordingly, embodiments of the present invention are directed to facilitating efficient and effective sketch to painting transformations. In this regard, a sketch generated or provided by a user (e.g., a hand-drawn sketch) can be transformed or converted into an electronic painting in accordance with a desired painting style. At a high-level, upon input of a sketch, the sketch is converted into an electronic painting using a neural network system. Specifically, the sketch can be converted to an intermediate image using a first neural network, generally referred to herein as an image neural network. Thereafter, the intermediate image can be converted into an electronic painting using a second neural network, generally referred to herein as a painting neural network. Converting the sketch into an intermediate image prior to generating a painting enables a more accurate sketch to painting conversion. In this regard, such a multi-step approach allows additional detail to be extrapolated, anticipated, deduced, or projected, from the minimalistic features of the sketch in order to generate an electronic painting that maintains and/or adds features of the sketch in a desired painting style. In accordance with embodiments of the present invention, sketch to painting transformations can occur in real-time without a completed sketch being input for transformation. To this end, a user can provide a partial sketch or modify a sketch and, in real-time, preview generated electronic paintings and/or how modifications affect a generated painting.

In implementation, to perform sketch to painting conversions, a neural network system is used to generate an electronic painting from an input sketch. A neural network generally refers to a computational approach using large clusters of connected neurons. Neural networks are self-learning and trained rather than explicitly programmed so that a generated output reflects a desired result. As described herein, a neural network system can be trained by training an image neural network that converts sketches to images and training a painting neural network that converts images to paintings. Although generally described as separate neural networks, any number of neural networks, including a single neural network, can be trained in accordance with embodiments described herein.

Sketches to train such a neural network system can be generated using reference images (e.g., where the sketches used to train the system are synthetically generated sketches). Various methods can be used to generate training sketches from such reference images, so that the training sketches reflect different sketch styles and techniques to ensure that the neural network system is capable of recognizing a wide variety of styles and techniques of input sketches upon completion of its training. In addition, augmentation methods can be implemented to further enlarge the dataset for training the neural network system; expanding the dataset in such a manner during training results in a more finely tuned system that is less prone to over-fitting.

Generally, to train an image neural network system, the image neural network can be trained based on transformations of sketches to intermediate images output by the image neural network. In particular, an image neural network can output a training image based on a sketch generated from a reference image. Thereafter, the training image is compared with the reference image, from which the input sketch was generated, to determine errors between the training image and the reference image. Such errors are then fed back through the image neural network to appropriately train the neural network, for instance, by adjusting the weight of the network connections to reduce the value of the error. In this way, the network architecture remains the same but the weights of the network connections are retrained during each iteration of training to reduce errors. Training of such a network can occur for a variety of categories so that the network can recognize, for example, faces, people, animals, cars, bedrooms, and/or landscapes.

A similar process is performed to train a painting neural network. More specifically, a training image is provided to the painting neural network to output a training painting. The training painting can then be compared to the training image and/or a stylistic reference painting to determine any errors. Such errors are then fed back through the painting neural network to appropriately train the neural network, for instance, by adjusting the weight of the network connections to reduce the value of the error. For each iteration during training, the network architecture remains the same but the weights of the network connections are retrained to reduce errors. Training of such a network can occur for a variety of painting styles.

This process can be repeated for a sufficiently large number of training cycles, until the neural network system converges to a state where the error of the calculations is small enough such that the output paintings produced reach a desired threshold level of similarity to the style of a reference painting and to the features of an input sketch. As can be appreciated, training the image neural network and the painting neural network may occur sequentially or concurrently. In addition, such a neural network system can be trained for multiple styles of paintings, allowing a user to select a painting style they wish to apply to an input sketch when using such a trained system to transform an input sketch into a painting.

Training a neural network system to transform sketches to paintings using an intermediate image, as described herein, ensures extrapolation, anticipation, deduction, and/or projection, of an appropriate amount of detail from an input sketch to create a desirable electronic painting of a particular style that maintains and/or predicts features of the input sketch. To this end, during the training process, the neural network system learns to take into account differences between the intermediate image transformed from an input sketch and a reference image used to generate the sketch. Such training ensures that the neural network system recognizes an amount of detail to include in the intermediate image so that the sketch can be successfully converted into an electronic painting that maintains the features of the sketch. Additionally, such training allows for adding, filling in, and/or correcting any missing or inaccurate details in an input sketch. For example, such training allows the system to learn to add a missing eye or eyebrows and/or modify cartoonish or amateur sketches to correct proportions such as the size of eyes in relation to facial size. The neural network system also learns to take into account differences between the painting transformed from the intermediate image, a stylistic reference painting, and/or the input intermediate image to influence a resulting painting to mimic the style of the reference painting while maintaining the features of the intermediate image, and thus maintaining the features of the original input sketch.

Further, such a neural network system can be trained for user guided colorization. Such training allows a user to indicate a preferred color in a region using a scribble or stroke of color. For example, in a bedroom scene, a blue scribble on a wall region and a red scribble on a bed region results in a painting with blue walls and a red bed.

Turning to FIG. 1, FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device can include at least one application supported by the creative apparatus 108. It is to be appreciated that following description may generally refer to the user device 102A as an example and any other user device can be used.

A user of the user device can utilize various products, applications, or services supported by the creative apparatus 108 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 102A-102N can be connected to a creative apparatus 108 via a network 106. Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user can create an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some embodiment, the user management engine 116 and the entitlement engine 124 can be one single engine performing the functionalities of both the engines.

The user can then install various applications supported by the creative apparatus 108 via an application download management engine 126. Application installers or application programs 128 present in the data storage unit 112 are fetched by the application download management engine 126 and made available to the user directly or via the application manager. In one embodiment, an indication of all application programs 128 are fetched and provided to the user via an interface of the application manager. In another embodiment, an indication of application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 104A-104N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 130 in the data storage unit 112 by a synchronization engine 132. Alternatively or additionally, such data can be stored at the user device, such as user device 102A.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

A user can operate one or more user devices to access data. In this regard, the application program data 130 is accessible by a user from any device, including a device which was not used to create the assets 140. This is achieved by the synchronization engine 132 that stores the application program data 130 in the data storage unit 112 and enables the application program data 130 to be available for access by the user or other users via any device. Before accessing the application program data 130 by the user from any other device or by any other user, the user or the other user may need to provide login details for authentication if not already logged in. In some cases, if the user or the other user are logged in, then a newly created asset or updates to the application program data 130 are provided in real time. The rights management engine 136 is also called to determine whether the newly created asset or the updates can be provided to the other user or not. The workspace data 156 enables the synchronization engine 132 to provide a same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. Such synchronization generally happens in real time. Similarly, synchronization of any type of the application program data 130 can be performed.

In some embodiments, user interaction with the applications 104 is tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the applications 104 that enables the application to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and options are provided to the user for publishing using the digital publishing application or any other application. In addition, while preparing the article, a recommendation can also be made by the synchronization engine 132 to incorporate some of other assets saved by the user and relevant for the article. Such a recommendation can be generated using one or more engines, as described herein.

The creative apparatus 108 also includes a community engine 164 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users are assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

Figure 2:
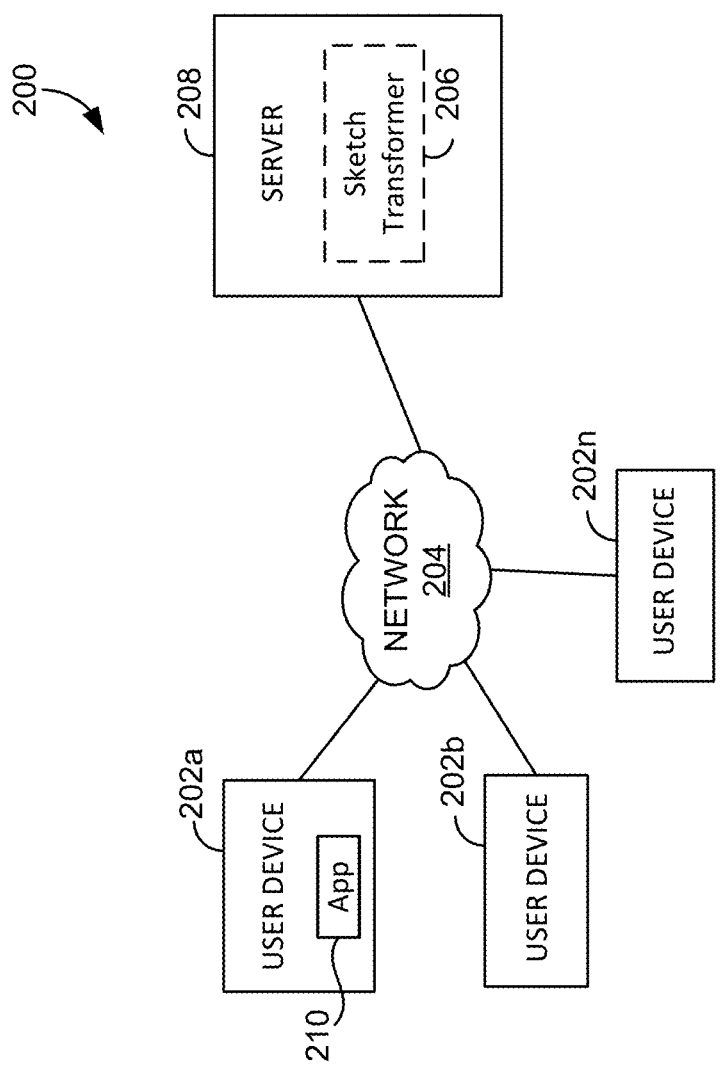
FIG. 2 depicts an example configuration of an operating environment in which some implementations of the present disclosure can be employed, in accordance with various embodiments of the present disclosure.

In accordance with embodiments of the present invention, application programs 128 can include an application, such as application 210 of FIG. 2, that facilitates sketch to painting transformations. Such an application can be provided to the user device 102A so that the sketch to painting transformation application operates via the user device. In another embodiment, such sketch to painting transformation can be provided as an add-on or plug-in to an application, such as a design or image processing application.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 200 shown in FIG. 2 is an example of one suitable operating environment. Among other components not shown, operating environment 200 includes a number of user devices, such as user devices 202a and 202b through 202n, network 204, and server(s) 208. Each of the components shown in FIG. 2 may be implemented via any type of computing device, such as one or more of computing device 700 described in connection to FIG. 7, for example. These components may communicate with each other via network 204, which may be wired, wireless, or both. Network 204 can include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within operating environment 200 within the scope of the present disclosure. Each may comprise a single device or multiple devices cooperating in a distributed environment.

User devices 202a through 202n can be any type of computing device capable of being operated by a user. For example, in some implementations, user devices 202a through 202n are the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 210 shown in FIG. 2. Application 210 is referred to as a single application for simplicity, but its functionality can be embodied by one or more applications in practice. As indicated above, the other user devices can include one or more applications similar to application 210.

The application(s) may generally be any application capable of facilitating the exchange of information between the user devices and the server(s) 208 in carrying out transforming a sketch into a painting. In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 210 can facilitate a sketch to painting transformation. In particular, a user can select or input a sketch to be transformed into a painting. A sketch can be selected or input in any manner. For example, a user may draw a sketch via a free-hand approach or utilizing drawing tools. As another example, a user may select a desired sketch from a repository, for example, stored in a data store accessible by a network or stored locally at the user device 202a. In addition to providing a sketch, a user may select a desired painting style that reflects a painting style preference to which the sketch can be transformed. A desired painting style can be selected in any number of ways. For instance, a set of paintings can be presented from which the user can select a particular painting portraying a desired painting style. As another example, a user may provide or input a painting having a desired style. Based on the input sketch and the painting style preference, a painting can be generated and provided to the user via the user device 202a. In this regard, the painting can be displayed via a display screen of the user device.

As described herein, server 208 can facilitate sketch to painting transformations via sketch transformer 206. Server 208 includes one or more processors, and one or more computer-readable media. The computer-readable media includes computer-readable instructions executable by the one or more processors. The instructions may optionally implement one or more components of sketch transformer 206, described in additional detail below.

Sketch transformer 206 can train and operate a neural network system in order to transform input sketches into stylized paintings. Such a neural network system can be comprised of one or more neural networks trained to generate designated output. For example, a neural network system can include a first neural network, such as an image neural network, that generates images from input sketches and a second neural network, such as a painting neural network, that generates electronic paintings from the images generated by the first neural network.

At a high level, sketch transformer 206 trains a neural network system, including an image neural network and a painting neural network. To train the image neural network, an intermediate image can be generated using the image neural network based on an input sketch generated from a reference image. An input sketch generally refers to a sketch provided to the neural network system, or portion thereof. Input sketches used to train the image neural network may be referred to herein as training sketches or training input sketches. An intermediate image generally refers to an image generated via the image neural network. Intermediate images generated in accordance with training the image neural network may be referred to herein as training images or training intermediate images. The generated intermediate image can be compared to a reference image to facilitate training of the image neural network. In this regard, the image neural network can be modified or adjusted based on the comparison such that the quality of subsequently generated intermediate images increases. Such training helps to maintain features of an input sketch during the sketch to painting conversion.

In accordance with embodiments described herein, a training input sketch used to generate a training intermediate image can be generated from a reference image. As used herein, a reference image refers to an image used to generate a training intermediate image. Such a reference image is used as a standard, or ground-truth, for evaluating the quality of an intermediate image transformed from the training sketch by the image neural network.

To train the painting neural network, an image may be provided to the painting neural network, where the painting neural network generates an output painting from the image. Although the image provided to the painting neural network is generally referred to herein as the training intermediate image, as can be appreciated, the image may be, but need not be, a training intermediate image produced by the image neural network. As such, in addition to or in the alternative to using training intermediate images produced by the image neural network, other training images can be provided to the painting neural network for training in accordance with embodiments described herein. As such, images used to train a painting neural network may be referred to as training images or training intermediate images. An output painting generally refers to an electronic painting generated via a neural network, such as a painting neural network. In embodiments, the electronic painting reflects feature(s) of an input sketch and mimics a style associated with a reference painting. A training output painting refers to an output painting that is used to train the painting neural network. A reference painting refers to a painting used as a standard for evaluating the quality of the style of a training output painting. A reference painting may be selected or designated, either directly or indirectly, by a user. The painting neural network can be updated based on the comparison of training output paintings with reference paintings and training images in order to improve the quality of future output paintings produced by the training neural network.

In various implementations, a neural network system comprised of an image neural network and a painting neural network of sketch transformer 206 is iteratively trained using multiple training input sketches to generate training output paintings. This training process can occur separately for the image and painting neural networks or simultaneously. In each iteration, sketch transformer 206 can select a reference image to convert into a training sketch. Sketch transformer 206 uses an image neural network to generate a training intermediate image from the input training sketch. The training intermediate image can then be compared to the reference image to compute any errors. Such errors are then fed back through the image neural network so the weight of network connections can be adjusted in order to reduce the value of the error. Sketch transformer 206 then uses a painting neural network to generate an output training painting from a training image, where, for example, the training image can be the training intermediate image of the image neural network. The training painting can then be compared to the training image and/or a stylistic reference painting to compute any errors. Such errors are then fed back through the painting neural network so the weight of the network connections can be adjusted in order to reduce the value of the error.

For cloud-based implementations, the instructions on server 208 may implement one or more components of sketch transformer 206, and application 210 may be utilized by a user to interface with the functionality implemented on server(s) 208. In some cases, application 210 comprises a web browser. In other cases, server 208 may not be required. For example, the components of sketch transformer 206 may be implemented completely on a user device, such as user device 202a. In this case, sketch transformer 206 may be embodied at least partially by the instructions corresponding to application 210.

Thus, it should be appreciated that sketch transformer 206 may be provided via multiple devices arranged in a distributed environment that collectively provide the functionality described herein. Additionally, other components not shown may also be included within the distributed environment. In addition, or instead, sketch transformer 206 can be integrated, at least partially, into a user device, such as user device 202a. Furthermore, sketch transformer 206 may at least partially be embodied as a cloud computing service.

Figure 3:
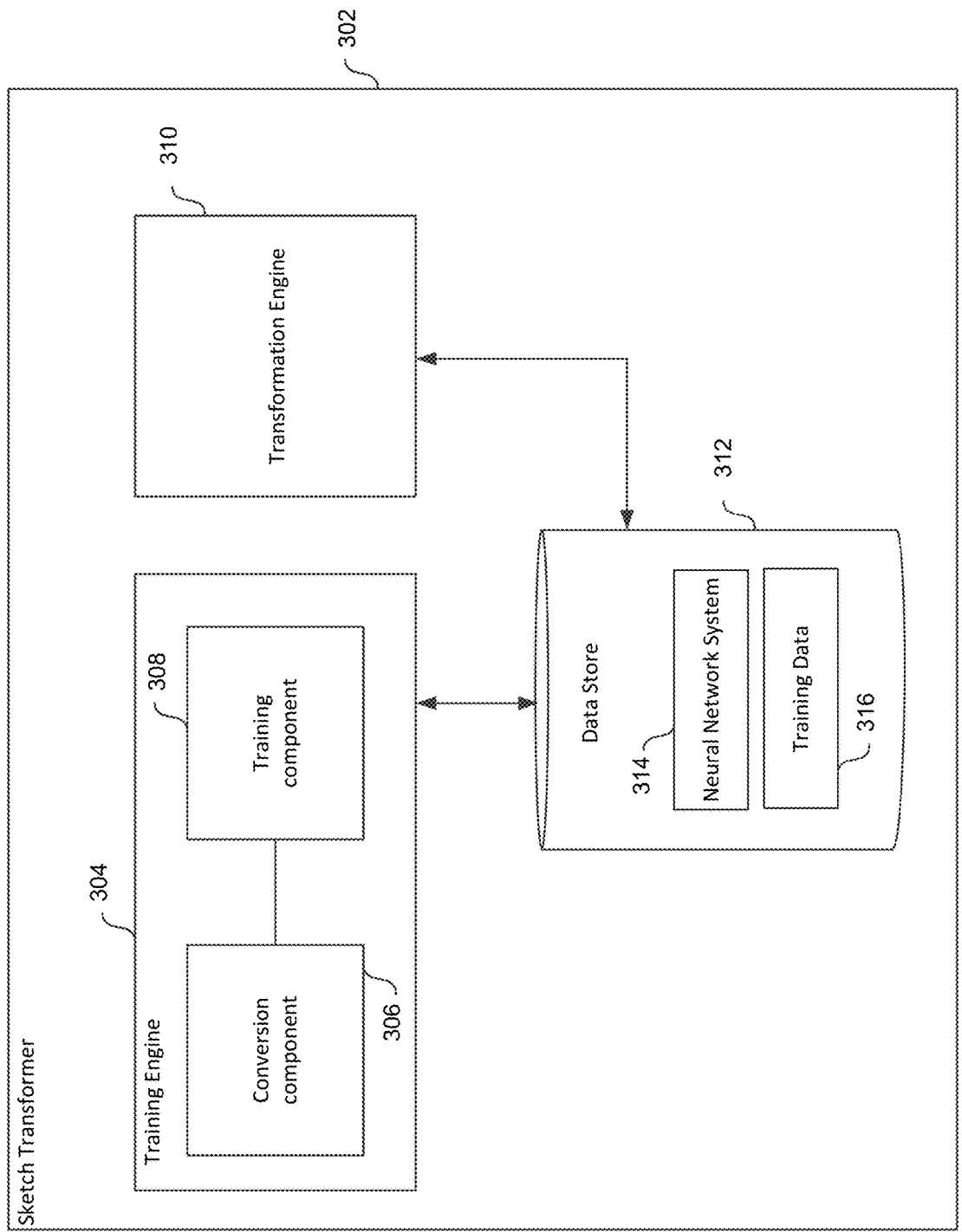
FIG. 3 depicts aspects of an illustrative sketch generating system performing a transformation from an input sketch into an output painting with an intermediate image, in accordance with various embodiments of the present disclosure.

Referring to FIG. 3, aspects of an illustrative sketch generating system are shown, in accordance with various embodiments of the present disclosure. Sketch transformer 302 includes training engine 304, transformation engine 310, and data store 312. The foregoing components of sketch transformer 302 can be implemented, for example, in operating environment 200 of FIG. 2. In particular, those components may be integrated into any suitable combination of user devices 202a and 202b through 202n, and server(s) 208.

Data store 312 can store computer instructions (e.g., software program instructions, routines, or services), data, and/or models used in embodiments described herein. In some implementations, data store 312 stores information or data received via the various components of sketch transformer 302 and provides the various components with access to that information or data, as needed. Although depicted as a single component, data store 312 may be embodied as one or more data stores. Further, the information in data store 312 may be distributed in any suitable manner across one or more data stores for storage (which may be hosted externally).

In embodiments, data stored in data store 312 includes training data 316. Training data generally refers to data used to train a neural network, or portion thereof. As such, training data 316 can include reference images, training sketches, training images, training paintings, and/or reference paintings. In some cases, data can be received by sketch transformer 302 from user devices (e.g., an input sketch received by user device 202a or another device associated with a user, via, for example, application 210). In other cases, data can be received from one or more data stores in the cloud.

Data store 312 can also be used to store neural network system 314. Such a neural network system can be comprised of one or more neural networks, such as an image neural network and a painting neural network.

Training engine 304 can be used to train neural network system 314. Such a neural network system can be used to generate electronic paintings from input sketches. In embodiments, the electronic paintings generated from a neural network system reflect a designated painting style and/or maintain features of an input sketch from which the electronic painting is generated. As depicted in FIG. 3, training engine 304 includes a conversion component 306 and a training component 308. Although a conversion component and training component are illustrated separately, as can be appreciated, the functionality described in association therewith can be performed by any number of components.

Conversion component 306 can generate training sketches from reference images. Reference images can include photographs, highly detailed pictures with realistic textural details where the level of detail is comparable to that of a photograph, and/or other similar images. Reference images can be obtained from various sources. In some embodiments, conversion component 306 can use various methods to generate training sketches that reflect different sketch styles and techniques to ensure that the neural network system is capable of recognizing a wide variety of styles and techniques of input sketches upon completion of its training. For example, a trained neural network can be used to stylistically convert a reference image into a generated sketch. As another example, conversion component 306 can use a difference-of-Gaussians operator to convert a reference image into a generated training sketch. As yet another example, image filters, such as Photoshop® filters, can be applied to reference images to generate training sketches. As another example, conversion component 306 can use facial images paired with sketches drawn by an artist for each of the facial images (e.g. Chinese University of Hong Kong Face Sketch Database). Having conversion component 306 use various methods to generate or provide training sketches results in a more robustly trained neutral network system due to the greater diversity of sketch types from which the system is trained to recognize and generate paintings.

Conversion component 306 can also be used to implement augmentation methods to further enlarge the dataset for training a neural network system. Training sketches can be augmented in any number of ways to expand the data set of training sketches. Expanding the dataset in such a manner during training results in a more finely tuned system for converting input sketches into output paintings that is less prone to over-fitting. One method of augmentation includes occluding portions of a training sketch, thereby forcing the image neural network to learn to fill in any missing features. Cropping generated sketches, on the other hand, trains the image neural network to be invariant to specific locations of object features. A further method includes enhancing or reducing the contrast of a training sketch so that the system can learn to generalize input sketches that have different contrasts or background colors. Still further, random alpha blending can be applied to a training sketch to improve generalization of the trained system. Another method includes masking out the background of a training sketch to train the neural network system to discard unimportant lines from an input sketch during transformation into an output painting. Such an augmented dataset can be stored, for example, in training data 316 on data store 312.

Conversion component 306 can also be used to synthesize rough color to train the system to recognize preferred colors in regions. To accomplish this, training data can be generated by placing colored strokes or scribbles on top of a training sketch. Alternatively, training data can be generated by extracting a one-channel grayscale image from the training image and combining it with a three-channel image containing colored strokes or scribbles. When generating the colored strokes using the training image, to emulate arbitrary user behaviors, a number of colored strokes of random length and thickness can be sampled from random locations. When growing a stroke, if a difference between a pixel color and the stroke color exceeds a threshold level, the stroke is restated with a new color sampled at the color of the pixel. In addition, the reference image can be blurred and a random number of colored strokes of random length and thickness at random locations can be generated. These colored strokes can then be used to train the neural network system.

Training component 308 can select a training sketch for training a neural network system, for example, to train an image neural network within such a system. Such a training sketch can be selected, for example, from training data 316 on data store 312. A training sketch can include rough color information to train the system for guided coloration. The image neural network transforms the training sketch into a training intermediate image. This can be accomplished, for example, by downsampling the training sketch to a lower dimension, performing a sequence of non-linear transformations using a number of filters to generate the training intermediate image, and then upsampling the training intermediate image to the desired output size.

One implementation that allows for higher resolution input and can handle challenging image categories, such as bedroom scenes, employs an encoder-decoder-like architecture with residual connections. Specifically the architecture can include three downsampling steps, seven residual blocks at a bottleneck resolution, and three bilinear upsampling steps where two residual blocks follows each step. The use of such residual block to perform the non-linearly transformations eases the training of the network and improves the capability of neural network for more complex tasks. As such, the input gets downsampled several times to a lower dimension, goes through a sequence of non-linear transformations, and finally gets upsampled to the desired output size. Downsampling can use convolutions with stride 2 and the residual blocks can use stride 1. Stride indicates how many times a filter stops and performs its analysis. As such, during stride 1, the filter moves one pixel before performing its function and during stride 2, the filter moves two pixels before performing its function.

The image neural network can then be trained by evaluating differences between the reference image used to create the training sketch and the training intermediate image to determine any errors or discrepancies therebetween, as described in more detail below. Errors can include inaccuracies, flaws, variations, and/or divergences between the training intermediate image and the reference image. Such errors can be determined by comparing parameters of the training intermediate image and the reference image to find a loss function. Such parameters and loss function are further defined below. In some embodiments, updating the neural network involves feeding such errors back through the image neural network so the algorithm can adjust network connections in order to reduce the value of the error.

Adjusting the neural network to correct for errors is accomplished by changing at least one node parameter of such an image neural network. The image neural network can comprise a plurality of interconnected nodes with a parameter, or weight, associate with each node. While individual parameters do not have to be specified during training of a neural network, examples of such parameters can include edge detection, RGB color, textures of features, roughness and/or blur of a sketch. Each node receives inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation. The system described above with the three downsampling steps, seven residual blocks at the bottleneck resolution, and three bilinear upsampling steps where each step is followed by two residual blocks allows for around 7.8 million learnable parameters.

In embodiments, errors are determined by evaluating differences between a reference image and the training intermediate image produced by the image neural network using several methods. Errors can be determined, for example, using loss functions, such as reconstruction loss, adversarial loss, total variance loss, or the like. Errors determined using loss functions are used to minimize loss in the image neural network by backwards propagation of such errors through the network. For example, such differences can be determined by determining reconstruction loss. This can include analyzing pixel loss and/or feature loss.

Pixel loss is analyzed by comparing the RBG color differences between pixels of the reference image and the RGB color of corresponding pixels of the training intermediate image. This can be determined by finding the average per-pixel differences between the reference image and the training intermediate image. When training a system for guided colorization, pixel loss forces the network to be more precise with color by paying more attention to colored strokes on an input training sketch.

Feature loss is determined by comparing features of the reference image and features of the training intermediate image. Such a comparison can be performed utilizing an additional pretrained neural network to extract features from images. Such features can be distinct portions and/or objects of the training intermediate image and the reference image. For example, when the image is a portrait of a person, features could include one or both eyes, a mouth, and/or a nose of the person; when the image is a landscape, features could include one or more trees and/or a horizon line from the landscape; when the image is a bedroom scene, features can include a bed, a lamp, and/or a corner of a room. The pretrained network can extract features from the training intermediate image and the reference image and then compare the extracted features. Using features instead of pixels narrows down the search space, lowering the dimension and allowing for faster convergence. Errors determined using reconstruction loss are then used to minimize reconstruction loss in the image neural network through backwards propagation of such errors.

In other embodiments, adversarial loss can be used to train the image neural network. Adversarial loss is determined by whether the training intermediate image looks realistic. This can be accomplished by assigning a binary classification of 0 or 1 based on a comparison between the reference image and the training intermediate image. Zero can mean the training intermediate image does not look realistic, and one can mean the training intermediate image does look realistic. Such an analysis can be performed on a previously trained neural network trained to determine such differences. Errors determined using adversarial loss are then applied to the image neural network through backwards propagation of such errors. Upon training the neural network system for adversarial loss, the network focuses on generating more realistic results with plausible color and change deviations from the reference image rather than putting emphasis on exactly reproducing the reference image.

In addition, total variation loss can be analyzed. Total variation loss compares the edges of the training intermediate image with the edges of the reference image. Correcting for total variation loss can improve contrast and sharpness in intermediate images.

In embodiments utilizing pixel loss, feature loss, adversarial loss, and total variance loss, an example of the final objective function becomes $L=w_p L_p + w_f L_f + w_{adv} L_{adv} + w_{tv} L_{tv}$. Where L represents loss function used to weight parameters of the system. $L_p$ represents pixel loss. $L_f$ represents feature loss. $L_{adv}$ equals adversarial loss. An example formula to calculate adversarial loss is $L_{adv} = \Sigma \log D_\phi(G_\theta(x_i))$ where $D_\phi$ is a weak discriminator that helps to stabilize training. $L_{tv}$ represents total variation loss. The weight parameters are represented by $w_p$, $w_f$, $w_{adv}$, and $w_{tv}$.

In a first stage of training an image neural network, adversarial weight, $w_{adv}$ can be set to zero in equation $L=w_p L_p + w_f L_f + w_{adv} L_{adv} + w_{tv} L_{tv}$. This allows the network to focus on minimizing feature and pixel loss. Additionally, to enforce a fine-grained control using an input sketch to discourage the network from ignoring important details such as the exact location of features, the weight of pixel loss, $w_p$, and feature loss, $w_f$, can be set to one and the weight of total variation loss, $w_{tv}$, can be set to 1e-5.

In further training stages, after the image neural network is trained to minimize feature and pixel loss, adversarial loss can be incorporated. For example, when transforming a grayscale sketch into an intermediate image, pixel loss can be set to zero and the system trained using feature loss and adversarial loss. Such training occurs utilizing the following weight settings: $w_f=1$, $w_p=0$, $w_{tv}=0$, $w_{adv}\approx 1e8$. When training a system for guided colorization, adversarial loss is deemphasized so that results better satisfy color constraints; as such, to accomplish such training, $w_f=1$, $w_p=1$, $w_{tv}=0$, $w_{adv}\approx 1e5$.

Training component 308 can further train a painting neural network. In this regard, a training image, such as a training intermediate image, can be provided to a neural network system, specifically to a painting neural network within such a system. As described, a training image can be a training intermediate image produced by the image neural network. Alternatively, a training image can be selected from training data 316 in data store 312. The painting neural network can produce a training output painting based on a training image. The painting neural network can then be trained by evaluating differences between a reference painting, the training image, and/or the training output painting to determine any errors or differences therebetween. In some embodiments, modifying or training the neural network involves feeding such errors back through the painting neural network so the algorithm can adjust network connections in order to reduce the value of the error.

Adjusting the neural network to correct for errors is accomplished by changing at least one node parameter of such a painting neural network. The painting neural network can comprise a plurality of interconnected nodes with a parameter, or weight, associate with each node. Such parameters can include image colors, painting colors, textures, details, brush strokes, and/or whether the subject looks like the subject. Each node receives inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words multiplied by the parameter, prior to being summed. In this way, the parameters can control the strength of the connection between each node and the next. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

In embodiments, errors are determined by evaluating differences between a reference painting, a training output painting, and/or a training image using any number of methods. To this end, the network can be trained by evaluating differences between a reference painting, a training image, and a training output painting produced by the painting neural network. Training involves modifying the neural network based on the differences between the reference painting, the training image, and the training output painting. Such modification of the neural network can involve changing at least one of the node parameters.

Errors can be determined using loss functions, which are used to minimize loss in the training neural network by backwards propagation of such errors through the network. For example, such differences can be analyzed by determining style loss. Style loss is used to compare color and texture information between the reference painting and the output training painting. Style loss can be determined using Gram matrices where a Gram matrix is an inner product matrix between vectorized feature maps of an electronic painting. Differences can also be analyzed by determining content loss. Content loss is determined by comparing the features of the output training painting with the features of the training image. Errors determined using style loss and/or content loss can then be applied to the painting neural network through backwards propagation to minimize similar errors.

In execution, a neural network system, trained according to the present disclosure, can be used to transform input sketches into paintings, such as stylized paintings. Such transformation can be performed using transformation engine 310. As can be appreciated, a trained neural network system, such as a trained image neural network and a trained painting neural network, can be used by the transformation engine to perform sketch to painting transformations. The method of transforming sketches can be similar to the process described for training the neural network system, however in execution, input sketches are typically not generated from reference images as training input sketches were during training, and intermediate images are not typically evaluated against reference images.

A sketch can be received from a user at a user device. Such a sketch can include an in-process sketch a user is drawing in real-time using a computing device such as those described with reference to FIG. 7. The sketch can be input using techniques including a touch screen, a stylus, a mouse, and/or a track pad. In other embodiments, a user can input the sketch by inputting a link or URL to a sketch. Alternatively, a user could select a sketch from a group of sketches stored in a database, such as data store 312 of FIG. 3.

An image neural network can transform the sketch into an intermediate image. This intermediate image fills in missing details and/or colors from the coarse sketch with or without spare color strokes. A category can also be input along with the received sketch in order ensure that the image neural network knows the sketch category. For instance, a portrait if the sketch is of a face, a person if the sketch is of a full body, a type of animal, or a car, landscape, or type of plant. Incorporating a category allows the neural network to better, and more accurately, apply its training to the input sketch. If no colors are provided with the sketch for guided colorization, in an embodiment, the intermediate image can be output to a user for guided image colorization. This process can allow a user to place one or more color strokes on the intermediate image to generate a colorized intermediate image.

The intermediate image can then be provided to a trained painting neural network to generate a stylized painting. The style of the painting can be selected from a list of paintings the neural network system for which the network has been trained to generate styles. Alternatively, there can be a default style that is applied to an input sketch, allowing a user to later change the painting style by selecting a different painting. Reference style options can be provided using a particular artist or piece of artwork either by name, using a picture, and/or both.

The generated painting maintains features of the input sketch as well as filling in missing details and colors. For example, if only one eye is in the input sketch, the neural network system can fill in, or add, the missing eye. Additionally, the trained neural network system is capable of modifying input sketches to increase their realism. For instance, if features are not in proportion to each other in the input sketch, the neural network system can correct the features to reflect more realistic proportions. However, if a user does not like the generated outcome, the user can make modifications to the input sketch. Given that an input sketch of resolution 256×256 takes 20 ms for such a trained network to transform into an intermediate image, a user can make modifications to compensate for unexpected results from the system or make modifications so the output more closely reflects a desired result. Modifications can also include modifying guided colorization of an input sketch. To change and/or add suggested colors, a user can add/modify colored strokes, or scribbles, on regions of the sketch.

Figure 4:
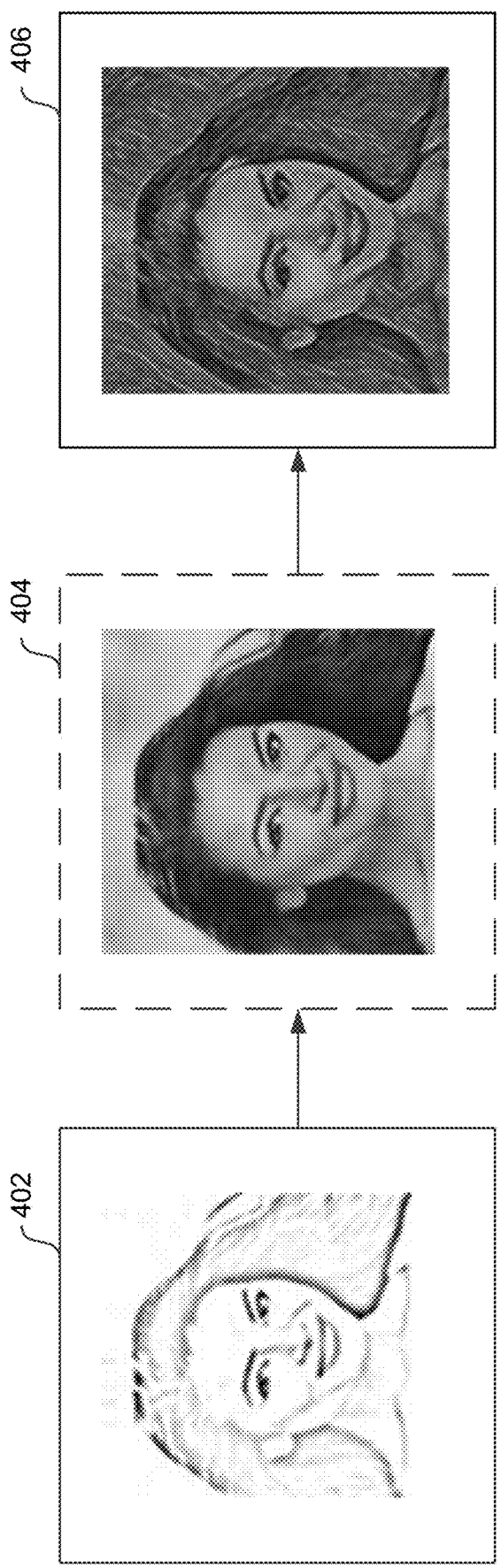
FIG. 4 provides an illustration of a method of transforming an input sketch into a stylized electronic painting, in accordance with embodiments of the present disclosure.

Turning now to FIG. 4, FIG. 4 provides an illustrated method of transforming an input sketch into a stylized electronic painting, in accordance with embodiments of the present disclosure. In embodiments for training a neural network system, sketch 402 is generated using a reference image. To create such a sketch, a transformation procedure such as an algorithm can be used on the reference image to generate the sketch. Sketch 402 can then be used to generate an intermediate image 404. In this embodiment, intermediate image 404 is compared with the reference image (not shown) used to generate sketch 402. A first neural network, for example, an image neural network, can produce a training intermediate image generated from training sketch 410 and the parameters such as those discussed above. The image neural network can be trained by evaluating differences between the reference image used to generate sketch 402 and image 404, where image 404 is a training intermediate image, produced by the image neural network. Such differences can be determined utilizing pixel loss, feature loss, adversarial loss and/or total variance loss. Creating an intermediate image such as image 404 forces the neural network system to learn to fill in missing details and colors from sketch 402 in a realistic way.

Image 404 can then be used to train a second natural network, for example, a painting neural network, to generate output painting 406 from a training intermediate image generated by an image neural network. The painting neural network can be trained by evaluating differences between a reference painting, image 404 produced by the image neural network, and/or output painting 406 produced by the painting neural network. Such differences can be determined utilizing style loss and/or content loss. It should be appreciated that this training process can occur separately or simultaneously.

In other embodiments, using a trained neural network for performing a sketch to painting transformation, a user inputs sketch 402 into a sketch transformer system, for example, sketch transformer 206 as described with reference to FIG. 2 and/or sketch transformer 302 as described with reference to FIG. 3. The sketch can be input by a user drawing a sketch using a computing system and/or providing a URL to an electronic sketch, for example. A trained neural network system, such as neural network system 314 run using transformation engine 310 as described with reference to FIG. 3, can create image 404 from sketch 402. Image 404 can be an intermediate image. Creating such an intermediate image allows additional detail to be extrapolated, anticipated, deduced, or projected, from the minimalistic features of sketch 402 in order to generate output painting 406 that maintains and/or adds to the features of sketch 402 in a desired painting style of a reference painting. Image 404 does not have to be displayed to the user but, in some embodiments, it can be displayed. For example, in embodiments where guided colorization takes place by adding color scribbles or strokes to an intermediate image instead of adding color scribbles or strokes to the input sketch. Output painting 406 can then be generated. Such an output painting can be displayed to a user on a user device, for example user devices 202a through 202n. Such a user device can be a computing device, such as computing device 700 further described with reference to FIG. 7. Output painting 406 can be displayed to a user in real-time as modifications are made to sketch 402. For example, a user can incrementally modify a sketch of a portrait to change the eyes, hair, and or add/remove head decorations. As another example, a user could change a color stroke on a bed in a bedroom scene so that the color of the bed changes from green to blue.

Figure 5:
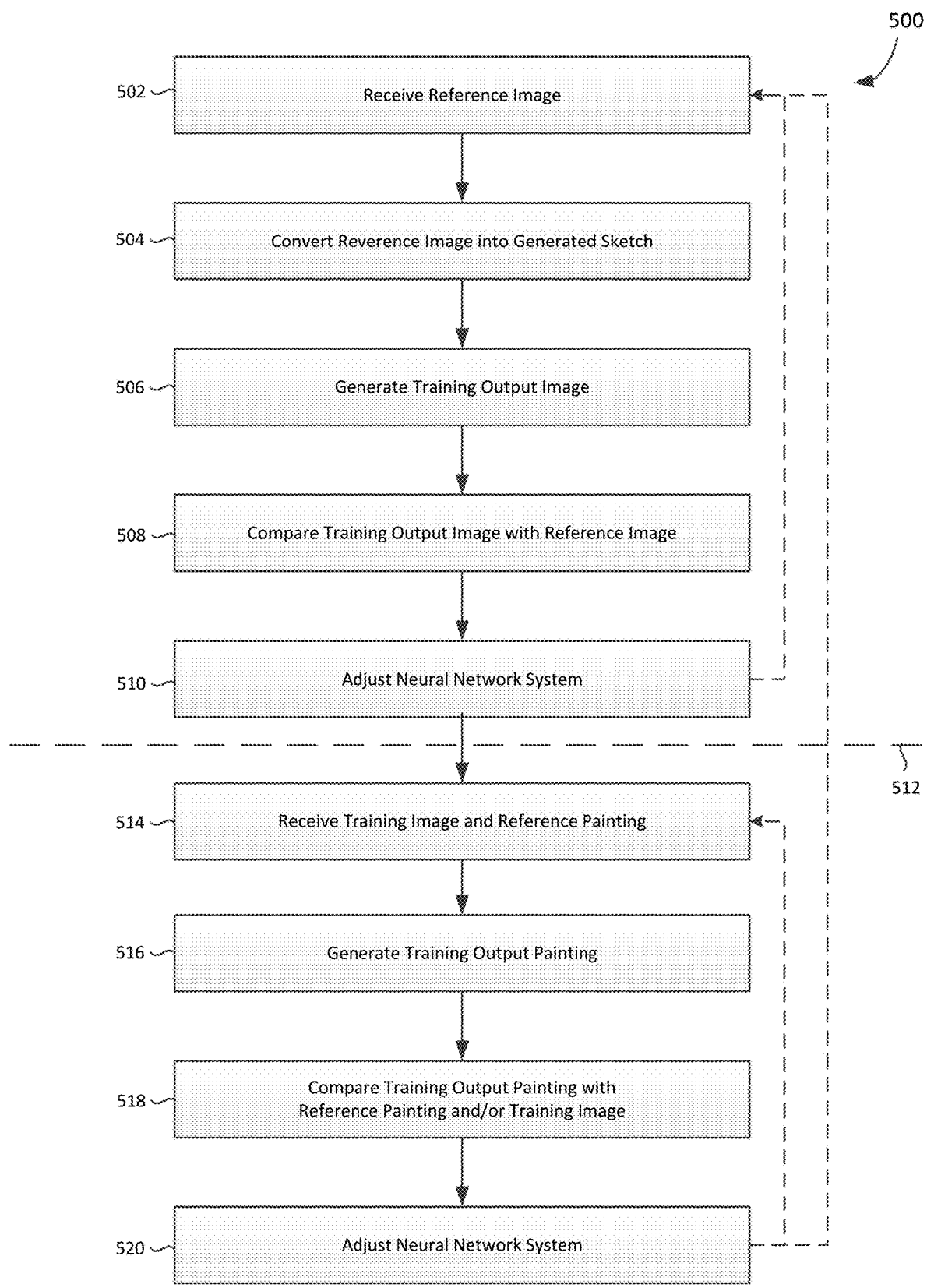
FIG. 5 illustrates a process flow showing an embodiment of a method for training a neural network system to transform sketches into stylized paintings, in accordance with embodiments of the present invention.

With reference to FIG. 5, a process flow is provided showing an embodiment of method 500 for training a neural network system to transform sketches into stylized paintings, in accordance with embodiments of the present invention. Blocks 502 through 504 include steps for receiving and creating training data. At blocks 506 through 522, method 500 includes steps for training a neural network system. The neural network system used in method 500 can be comprised of two neural networks as indicated by line 512; a first neural network, such as an image neural network, that performs blocks 506 through 510 and a second neural network, such as a painting neural network, that performs blocks 514 through 520. However, it should be appreciated that method 500 could be performed using one neural network or more than two neural networks.

At block 502, a reference image can be received. Such a reference image can be received from, for example, training data 316 stored on data store 312 of FIG. 3 and/or from an image database stored in the cloud. At block 504, the received reference image can be converted into a training sketch using a transformation procedure such as an algorithm. For example, Photoshop® filters can be applied to the reference image. In addition, at block 504, the generated training sketch can be altered to further train the neural network system. Such data augmentation creates a significantly larger data set for training the neural network system, decreasing over-fitting. For instance, data augmentation can include occluding a portion of a training sketch, cropping a training sketch, altering contrast of a training sketch, alpha blending a training sketch, masking out a background of a training sketch, and blurring a training sketch.

At block 506, a training intermediate image can be generated from the training sketch using a neural network system. For example, a first neural network, such as an image neural network, of the neural network system can be used to generate such a training intermediate image. At block 508, the training intermediate image can be compared with the reference image used to generate the training sketch. This comparison includes determining loss functions such as adversarial loss, total variance loss, pixel loss, and/or feature loss. These comparisons can be used at block 510 where the neural network system can be adjusted using the determined loss functions. Errors determined using loss functions are used to minimize loss in the neural network system by backwards propagation of such errors through the system. As indicated in FIG. 5, the foregoing blocks may be repeated any number of times to train the first neural network of the neural network system (e.g., using a different reference image/generated sketch pair for each iteration).

At block 514, a training image and a reference painting can be received. Such a training image can be received from, for example, training data 316 stored on data store 312 of FIG. 3, from an image database stored in the cloud, and/or from the first neural network, as an intermediate image output by the first neural network. A reference painting can be received from a painting database for example, training data 316 stored on data store 312 of FIG. 3, from a painting database stored in the cloud. At block 516, a training output painting can be generated from the training image using a neural network system. For example, a second neural network of a neural network system can be used to generate such a training output painting, where the second neural network is a painting neural network. At block 518, the training output painting can be compared with a reference painting and the training image. This comparison includes determining loss function such as feature loss and/or content loss. Such comparisons can be used at block 520 where the neural network system can be adjusted using the determined loss functions. Errors determined using loss functions are used to minimize loss in the neural network system by backwards propagation of such errors through the system. As indicated in FIG. 5, blocks 514 through 520 may be repeated any number of times to train the second neural network of the neural network system (e.g., using a different training image/reference painting for each iteration). Alternatively, as indicated in FIG. 5, blocks 502 through 520 may be repeated any number of times to train the neural network system simultaneously (e.g., using a different reference image/generated sketch pair for each iteration to produce an output training image, such as a training intermediate image, used to generate a stylized painting).

Figure 6:
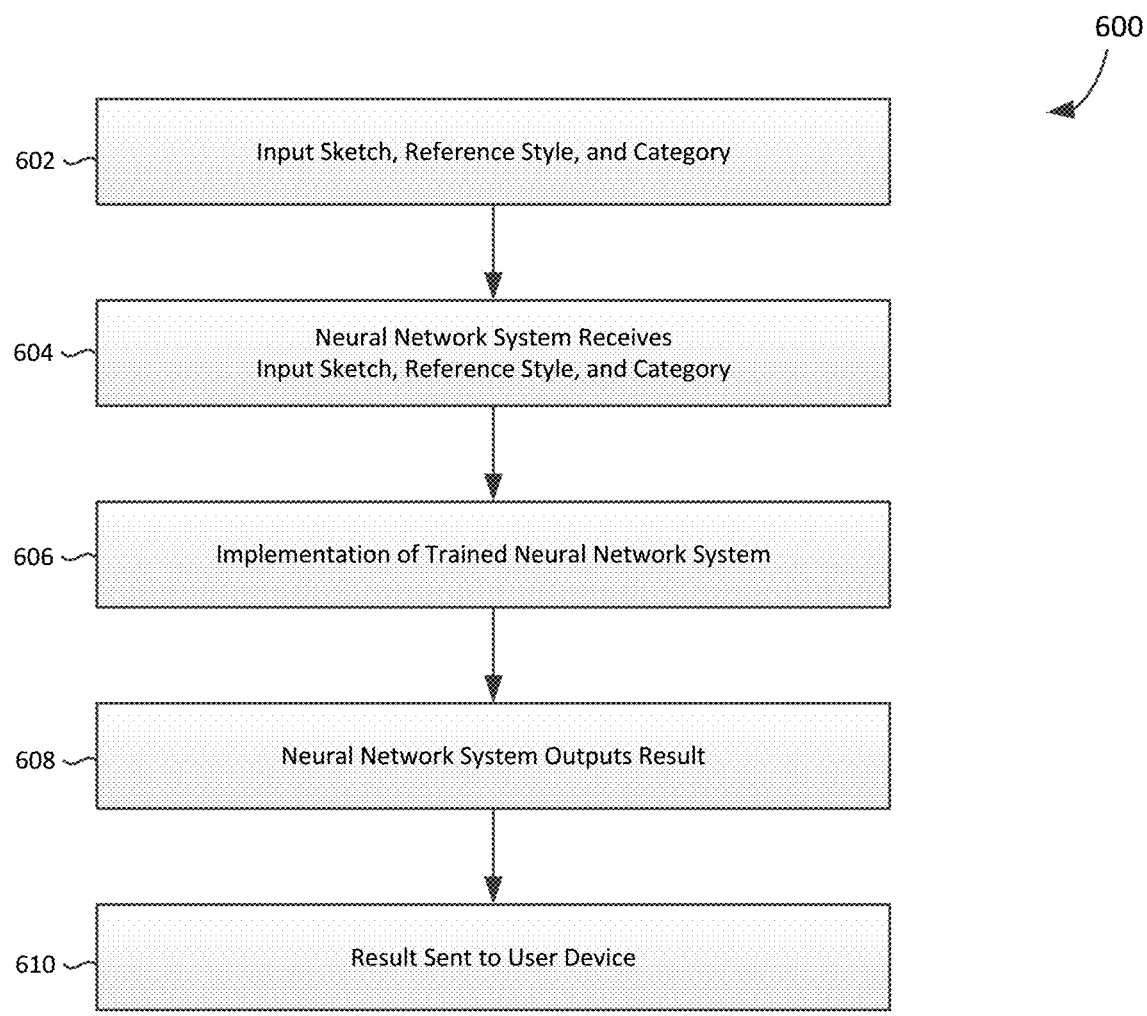
FIG. 6 illustrates a process flow showing an embodiment of a method for transforming sketches into stylized paintings, in accordance with embodiments of the present invention.

FIG. 6 illustrates an example method 600 for transforming sketches into stylized paintings, in accordance with embodiments of the present invention. Method 600 can be performed, for example by sketch transformer 206 of FIG. 2 and/or sketch transformer 302 utilizing neural network system 314 of FIG. 3 upon completion of training the system.

At block 602, a sketch, reference style, and a category can be input. For example, a user can input a sketch, reference style, and a category. The sketch can be an in-process sketch a user is drawing in real-time. Such an electronic sketch can be created using a computing device such as those described with reference to FIG. 7. The sketch can be input using techniques including a touch screen, a stylus, a mouse, and/or a track pad. In other embodiments, a user can input the sketch by inputting a link or URL to a sketch. Alternatively, a user could select a sketch from a group of sketches stored in a database, such as data store 312 of FIG. 3. A reference style can refer to the style of painting a user wishes to apply to the input sketch. For instance, such a reference style can be input by a user by selecting a painting from a list of paintings where a neural network system has been trained for the styles of the list of paintings. Alternatively, there could be a default style that is applied to an input sketch and a user could later change the painting style by selecting a different painting. Reference style options can be provided using a particular artist or piece of artwork either by name, using a picture, and/or both.

A category indicates what is depicted in the input sketch. For instance, a portrait if the sketch is of a face, a person if the sketch is of a full body, a type of animal, or a car, landscape, or type of plant. The category can be input by a user. In other embodiments, the category can be determined and input by an algorithm.

At block 604, a neural network system can receive the input sketch, reference style, and category. At block 606, the trained neural network system can be implemented to convert the input sketch into a result.

The neural network system can previously have been trained in a manner as described in reference to method 500 in FIG. 5. As such, the neural network system can be comprised of a first neural network, such as an image neural network, trained to convert input sketches into intermediate images and a second neural network trained to convert images into output paintings. The image neural network can be trained based on a comparison of a training intermediate image and a reference image used to generate a training input sketch. The second neural network, such as a painting neural network, can be trained based on a comparison of a training output painting to the training intermediate image and a reference painting. Upon conclusion of the training process, the trained image neural network and trained painting neural network can be used to generate paintings from sketches. This trained neural network system can be used to convert the inputted sketch into an intermediate image and then convert the intermediate image into a stylized electronic painting. The image neural network can be used to convert the inputted sketch into the intermediate image and the painting neural network can be used to generate a stylized electronic painting from the intermediate image.

At block 608, the neural network system outputs a result. Such a result can be an intermediate image, such as image 404 discussed with reference to FIG. 4. In addition, or alternatively, such a result can be an output painting, such as output painting 406. Such an output painting should accurately reflect features or anticipated features of the input sketch and the designated reference style. At block 610, the result output by the neural network system can be sent to a user device. Such a user device can be a user device such as user device 202*a* through 202*n* as depicted in FIG. 2. In embodiments, this output can be generated in real-time as a user makes modifications to the input sketch.

Figure 7:
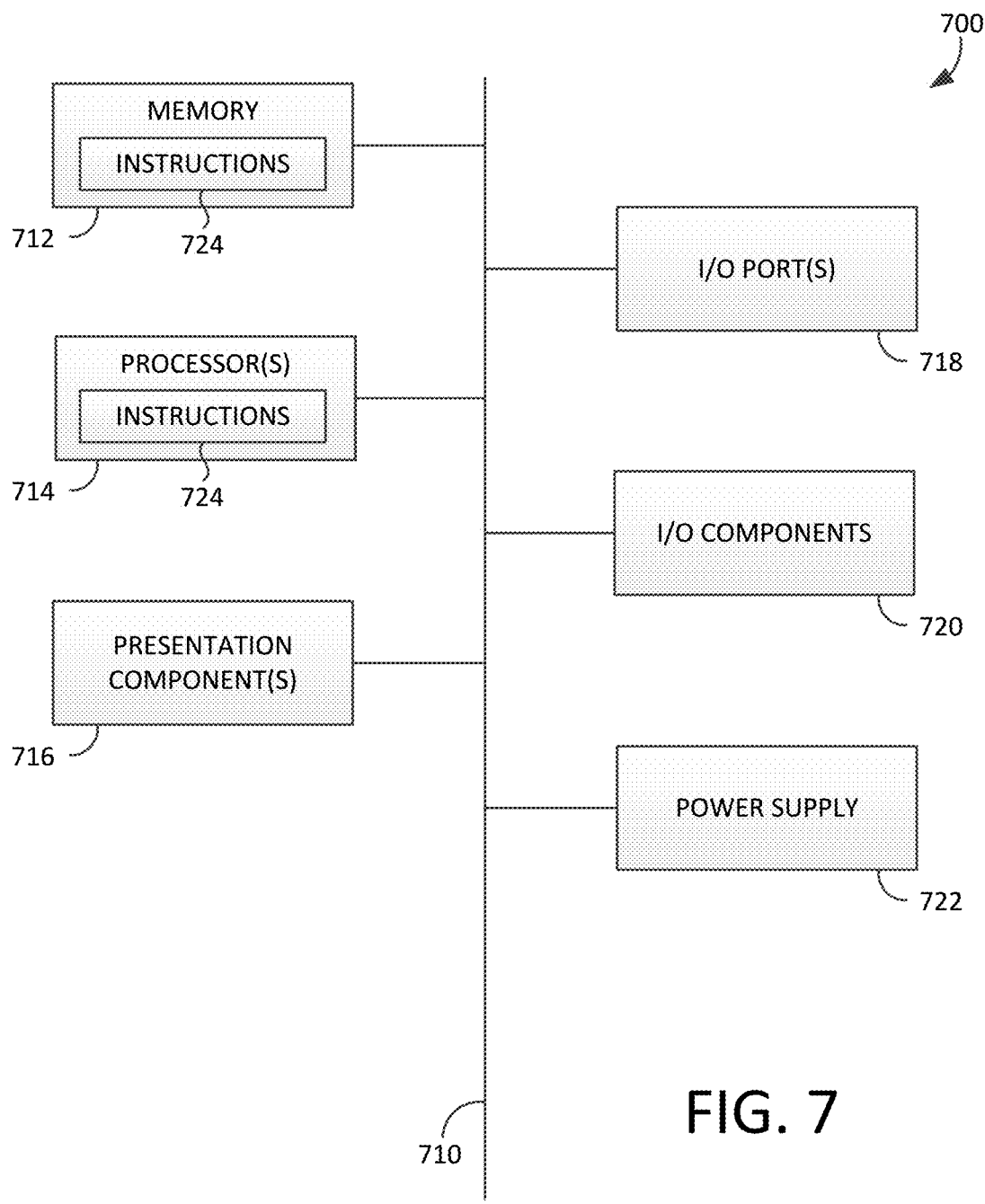
FIG. 7 is a block diagram of an example computing device in which embodiments of the present disclosure may be employed.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for training a neural network system to generate electronic paintings from sketches, the method comprising:
    training a first neural network that converts input sketches into intermediate images based on a predicted object feature related to the input sketches, one or more object features of the input sketches, and a particular user-input category associated with the input sketches, the predicted object feature determined based on the one or more object features extrapolated in the input sketches, wherein at least one of the intermediate images adds the predicted object feature as an additional sketch detail to provide a detail missing from the corresponding input sketch based on the particular user-input category indicating subject matter depicted in the corresponding input sketch, wherein the first neural network is trained based on a comparison of a training intermediate image and a reference image used to generate a training input sketch; and
    training a second neural network that converts the intermediate images into output paintings, wherein the second neural network is trained based on a comparison of a training output painting to at least one of the training intermediate image and a reference painting, wherein the trained first neural network and the trained second neural network generate paintings from sketches and the trained second neural network maintains the one or more object features represented in the input sketch and incorporates the predicted object feature of the intermediate image when transforming the intermediate image into the painting.

2. The computer-implemented method of claim 1, further comprising:
    receiving the reference image; and
    generating the training input sketch from the reference image using a transformation procedure.

3. The computer-implemented method of claim 2, wherein the reference image is associated with an input reference style that allows a neural network in the trained first neural network and the trained second neural network to generate paintings similar to the input reference style.

4. The computer-implemented method of claim 1, further comprising:
converting, by the first neural network, the training input sketch into the training intermediate image; and
adjusting the first neural network based on the comparison of the training intermediate image and the reference image.

5. The computer-implemented method of claim 4, wherein the comparing of the training intermediate image to the reference image includes at least one of determining adversarial loss, pixel loss, feature loss, and total variance loss.

6. The computer-implemented method of claim 1, further comprising:
generating, by the second neural network, the training output painting from the training intermediate image; and
adjusting the second neural network based on the comparing of the training output painting to at least one of the training intermediate image and the reference painting.

7. The computer-implemented method of claim 6, wherein the comparing of the training output painting to at least one of the training intermediate image and the reference painting includes at least one of determining style loss and content loss.

8. The computer-implemented method of claim 1, further comprising:
performing data augmentation on the training input sketch.

9. The computer-implemented method of claim 8, wherein data augmentation includes at least one of occluding a portion of the training input sketch, cropping the training input sketch, altering contrast of the training input sketch, alpha blending the training input sketch, masking out a background of the training input sketch, and blurring the training input sketch.

10. The computer-implemented method of claim 1, further comprising:
receiving a user modification to the input sketch; and
adjusting the output painting to reflect the user modification to the input sketch.

11. One or more computer-readable media having a plurality of executable instructions embodied thereon, which, when executed by one or more processors, cause the one or more processors to perform a method for converting input sketches into electronic paintings, the method comprising:
training a first neural network that converts input sketches into intermediate images based on a predicted object feature related to the input sketches and one or more object features of the input sketches, the predicted object feature determined based on the one or more object features extrapolated in the input sketches, wherein the first neural network is trained based on a comparison of a training intermediate image and a reference image used to generate a training input sketch and the predicted object feature is added as an additional sketch detail to provide detail missing from the input sketch based on a particular user-input category indicating subject matter depicted in the input sketch; and
training a second neural network that converts the intermediate images into output paintings, wherein the second neural network is trained based on a comparison of a training output painting to at least one of the training intermediate image and a reference painting, wherein the trained first neural network and the trained second neural network generate paintings from sketches and the trained second neural network maintains the one or more object features represented in the input sketch and incorporates the predicted object feature of the intermediate image when transforming the intermediate image into the painting.

12. The media of claim 11, the method further comprising:
receiving the reference image; and
generating the training input sketch from the reference image using a transformation procedure.

13. The media of claim 11, the method further comprising:
converting, by the first neural network, the training input sketch into the training intermediate image; and
adjusting the first neural network based on the comparison of the training intermediate image and the reference image.

14. The media of claim 13, wherein the comparing of the training intermediate image to the reference image includes at least one of determining adversarial loss, pixel loss, feature loss, and total variance loss.

15. The media of claim 11, the method further comprising:
generating, by the second neural network, the training output painting from the training intermediate image; and
adjusting the second neural network based on the comparing of the training output painting to at least one of the training intermediate image and the reference painting.

16. The media of claim 15, wherein the comparing of the training output painting to at least one of the training intermediate image and the reference painting includes at least one of determining style loss and content loss.

17. The media of claim 11, further comprising:
performing data augmentation on the training input sketch.

18. The media of claim 17, wherein data augmentation includes at least one of occluding a portion of the training input sketch, cropping the training input sketch, altering contrast of the training input sketch, alpha blending the training input sketch, masking out a background of the training input sketch, and blurring the training input sketch.

19. A computing system comprising:
one or more processors; and
one or more non-transitory computer-readable storage media, coupled with the one or more processors, having instructions stored thereon, which, when executed by the one or more processors, cause the computing system to provide:
means for training a neural network system, wherein the neural network system includes:
a first neural network trained to convert input sketches into intermediate images based on a comparison of a training intermediate image and a reference image used to generate a training input sketch and on a predicted object feature related to the input sketches and one or more object features of the input sketches, and a particular user-input category associated with the input sketches, the predicted object feature determined based on the one or more object features extrapolated in the input sketches, and
a second neural network trained to convert the intermediate images into output paintings based on a comparison of a training output painting to at least one of the training intermediate image and a reference painting, wherein at least one of the intermediate images adds the predicted object feature as an additional sketch detail to provide a detail missing from the corresponding input sketch based on the particular user-input category indicating subject matter depicted in the corresponding input sketch, wherein the trained first neural network and the trained second neural network generate paintings from sketches and the trained second neural network maintains the one or more object features represented in the input sketch and incorporates the predicted object feature of the intermediate image when transforming the intermediate image into the painting; and means for converting an input sketch into an output painting using the trained neural network system.

20. The system of claim 19, wherein the means for converting the input sketch into the output painting includes a real-time transformation of the input sketch into the output painting, wherein the output painting is output to a user device.

* * * * *